Figure 4:
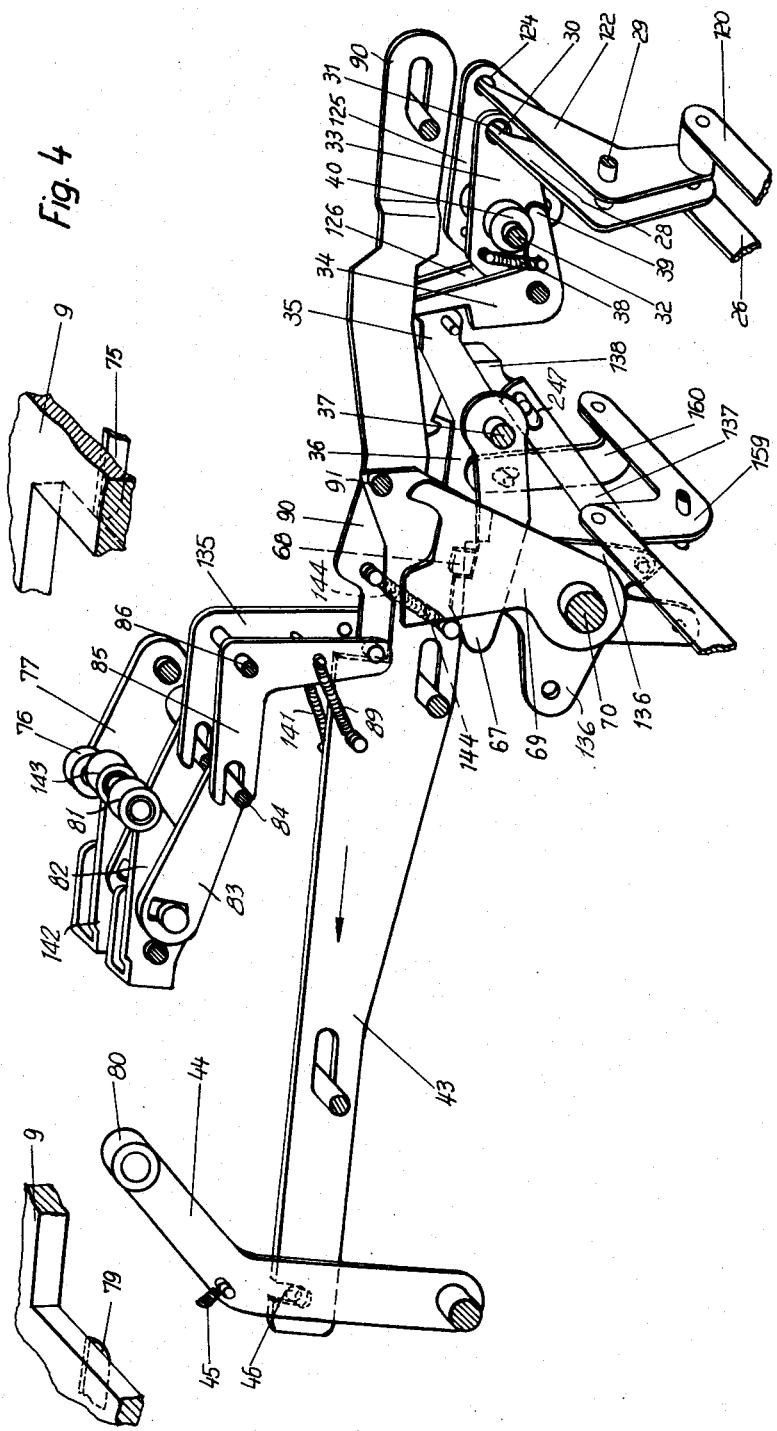

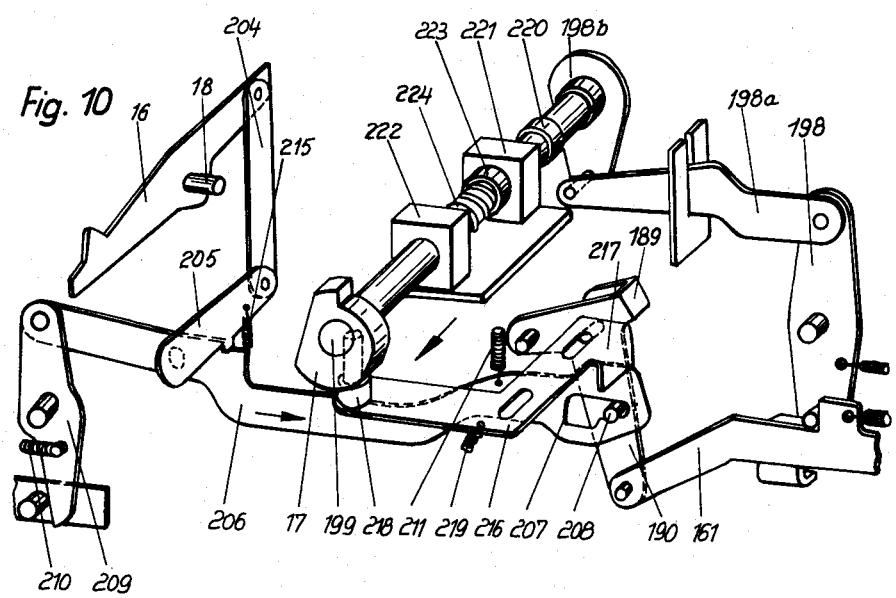
Fig. 10
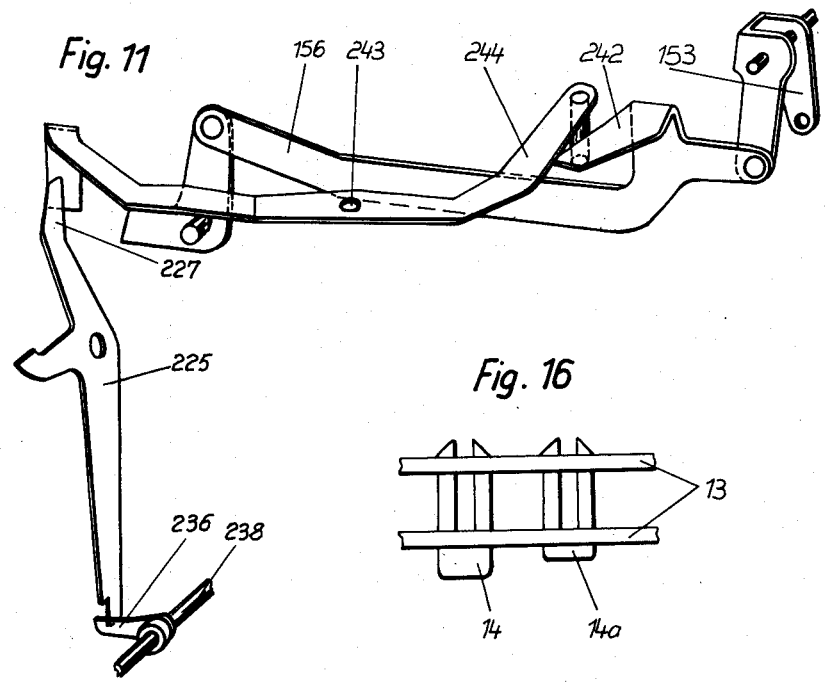
Fig. 11
Fig. 16

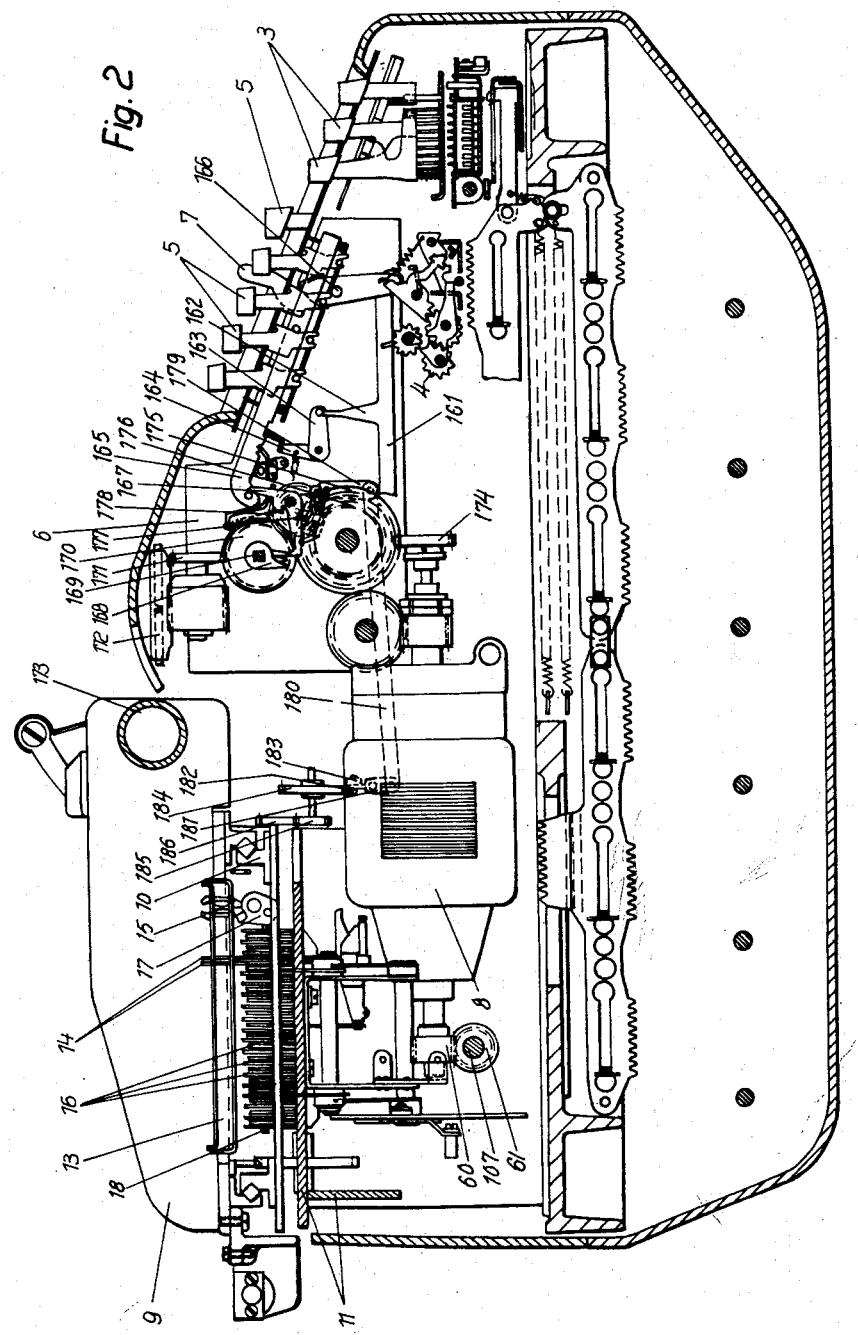

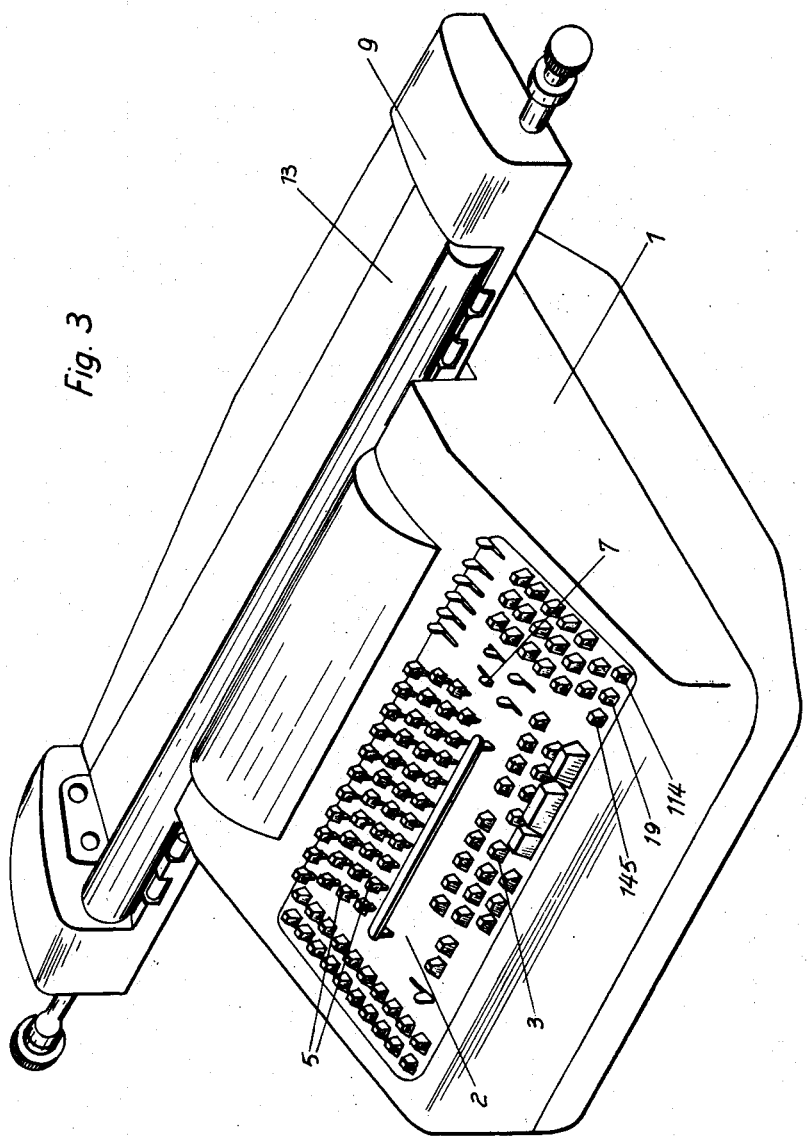

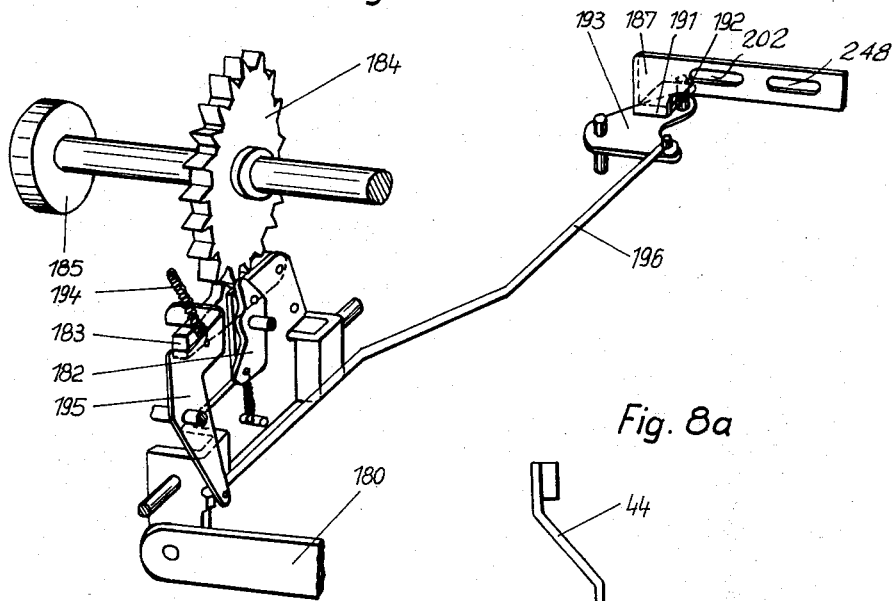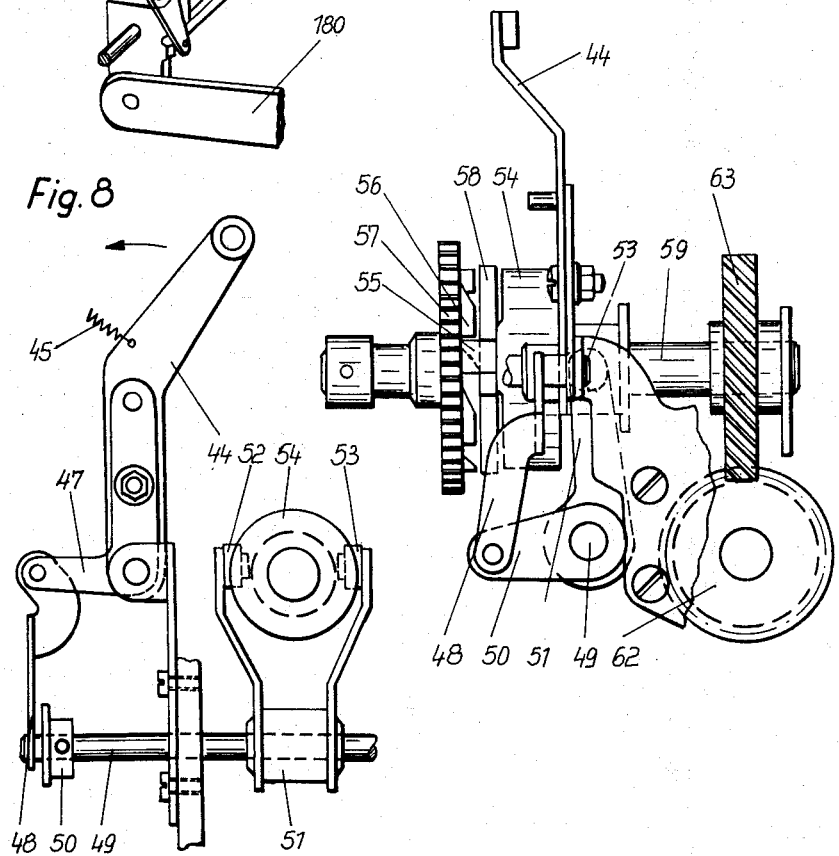

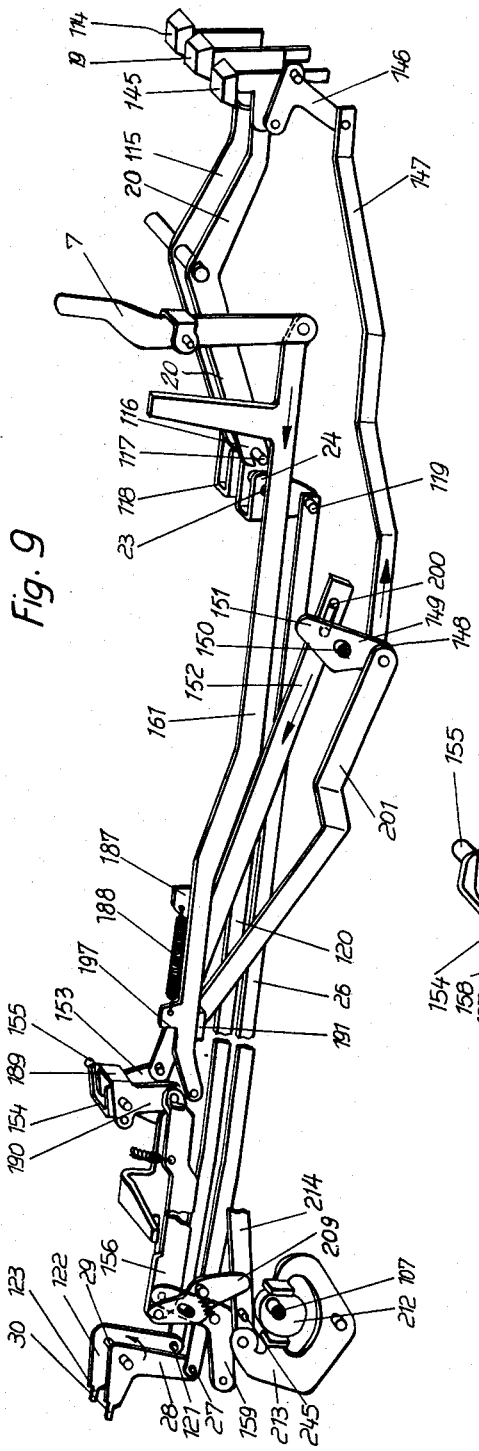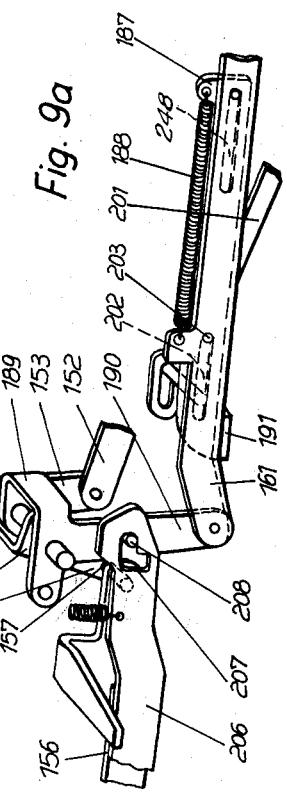

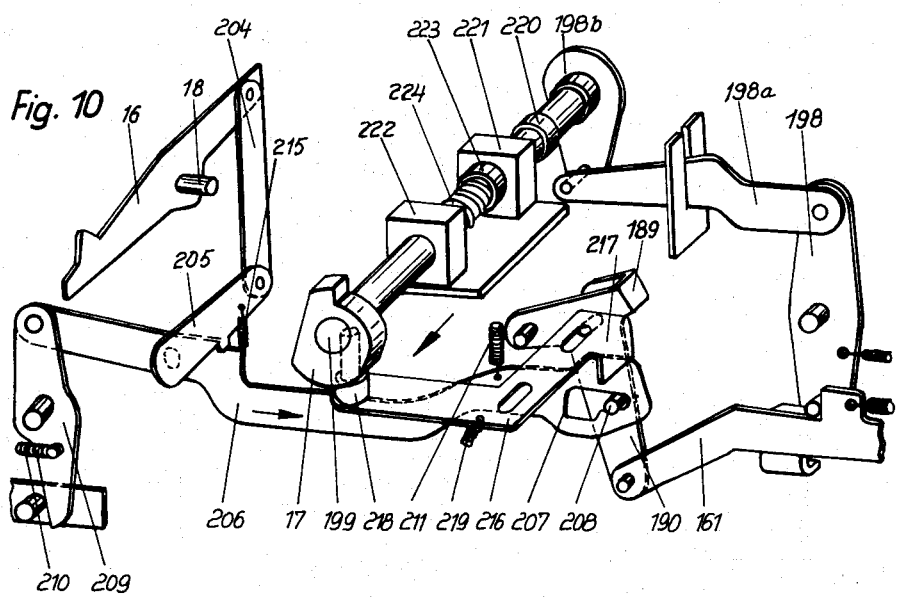
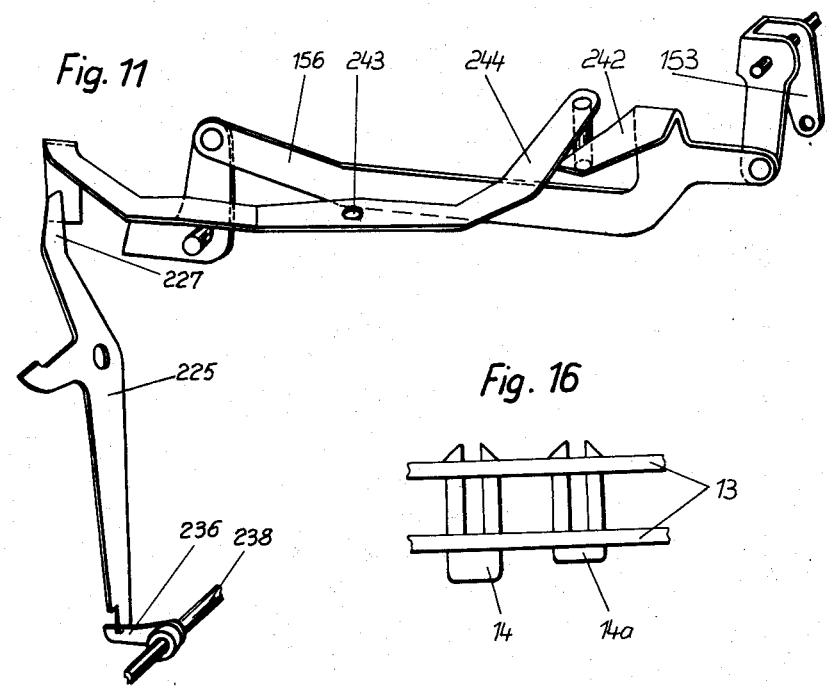

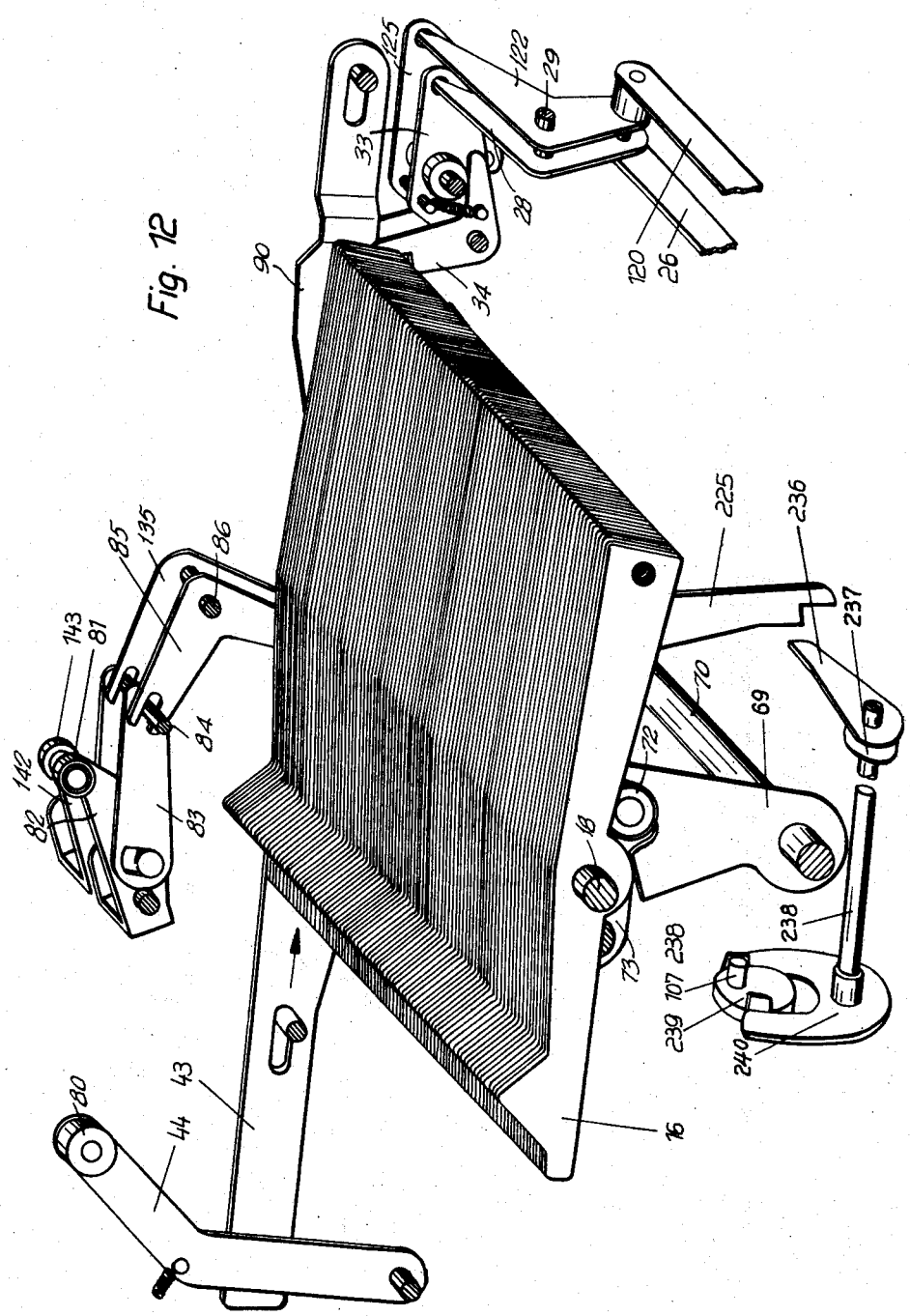

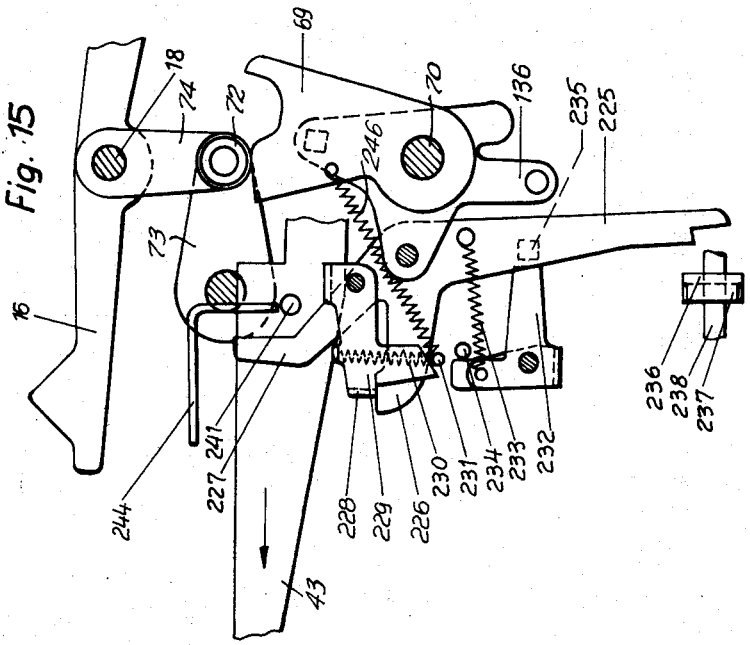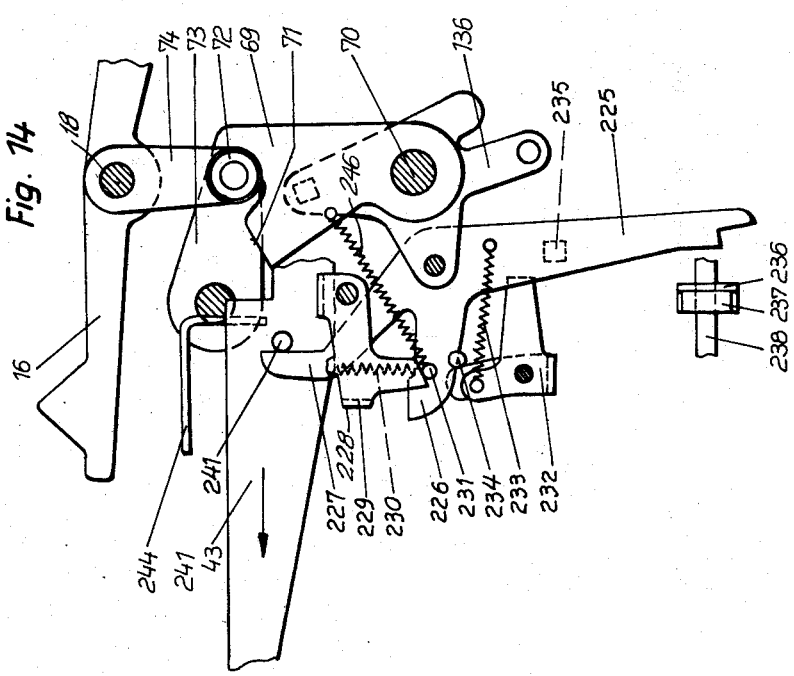

United States Patent Office 3,072,325
Patented Jan. 8, 1963

3,072,325
BOOKKEEPING OR SIMILAR OFFICE MACHINES WITH SEVERAL COUNTING MECHANISMS
Hellfried Köhler, Harry Güldner, Werner Tell, Gerhard Tippmann, and Eberhard Heerklotz, all of Karl-Marx-Stadt, Germany, assignors to VEB Buchungsmaschinenwerk Karl-Marx-Stadt, Karl-Marx-Stadt, Germany
Filed Mar. 18, 1959, Ser. No. 800,239
23 Claims. (Cl. 235—60.47)

This invention relates to an accounting machine or similar office machine with several counting mechanisms and preferably including a typewriter apparatus for writing the full text, and comprises a displaceable paper carriage which receives a program control set with a plurality of slides, which, for the purpose of program control, end in function levers which can be shifted to control the various functions. This invention is a continuation-in-part of application Serial No. 515,722, filed June 13, 1955, now abandoned.

It is a principal characteristic feature of the invention that during the tabulation motion of the paper carriage the function levers are lowered out of the way of the motion of the slides.

A further main characteristic feature of the invention is a novel mechanism for lowering the function levers out of the way during carriage return.

The accounting machine according to the invention is further provided with novel mechanism which, when activated, interrupts the normal accounting process and permits writing with the typewriter mechanism of the machine. It is a characteristic feature of the invention that upon changing over from normal accounting work to writing the complete text, the function levers are lowered out of the path of the motion of the program control set slides, in order to eliminate noise and decrease wear and tear.

A further characteristic feature of the invention is that the lowered stop levers are returned or lifted into the normal position by means of the driving motor of the machine.

Figure 5:
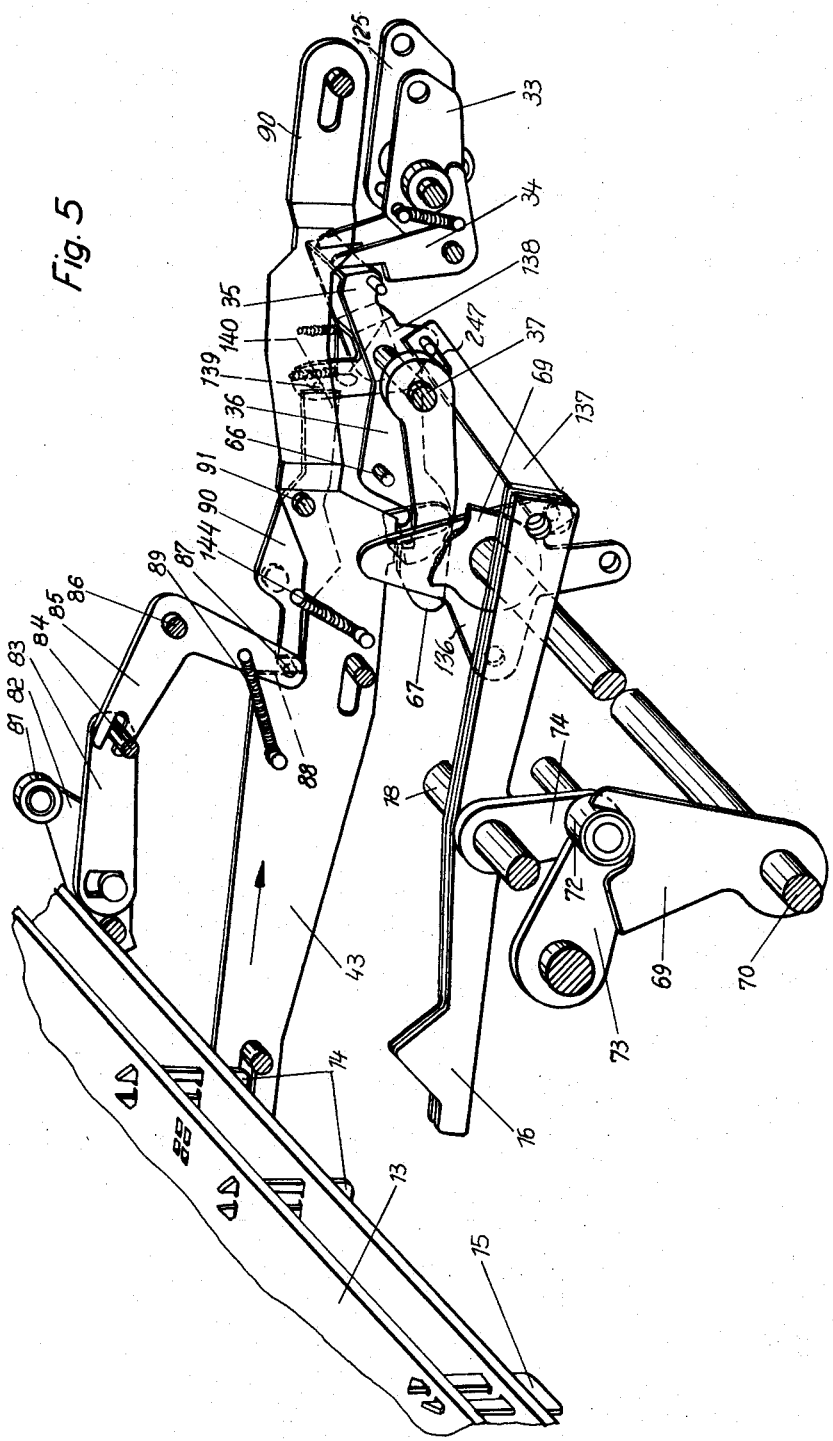
Figure 6:
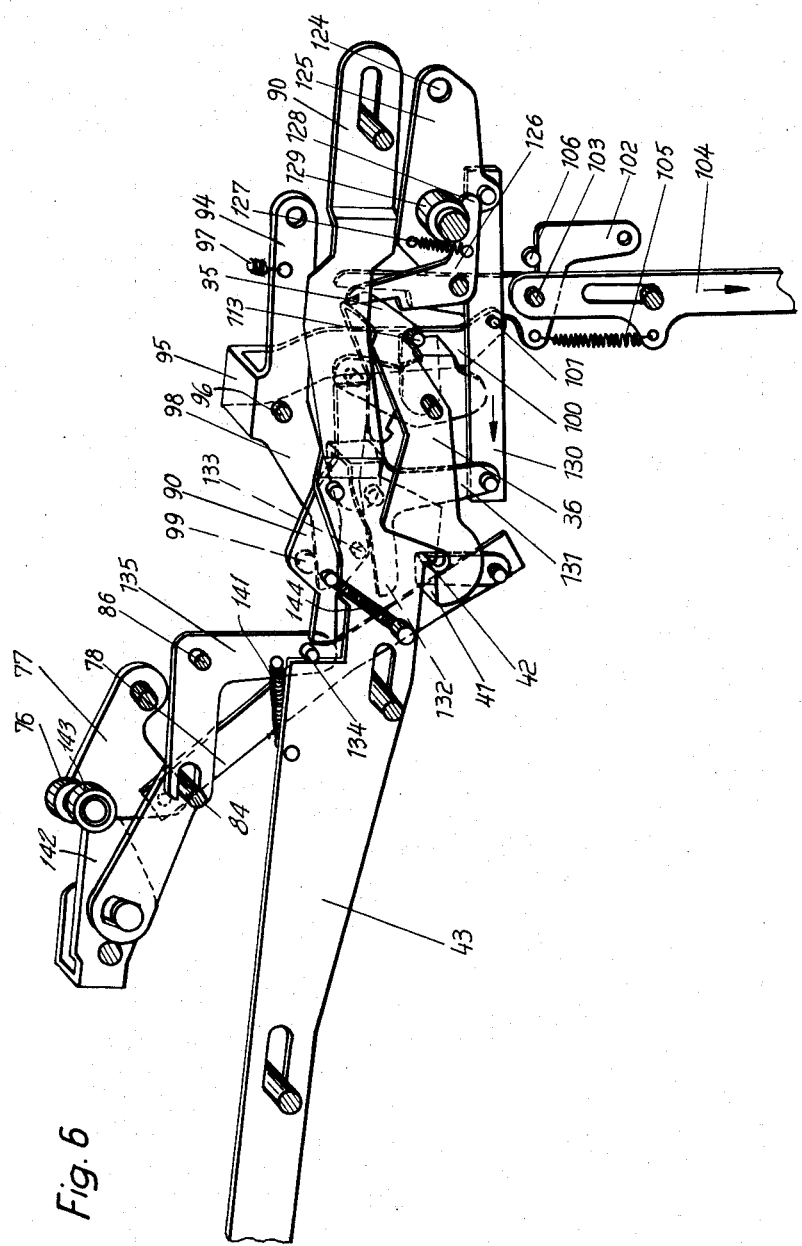
Figure 7:
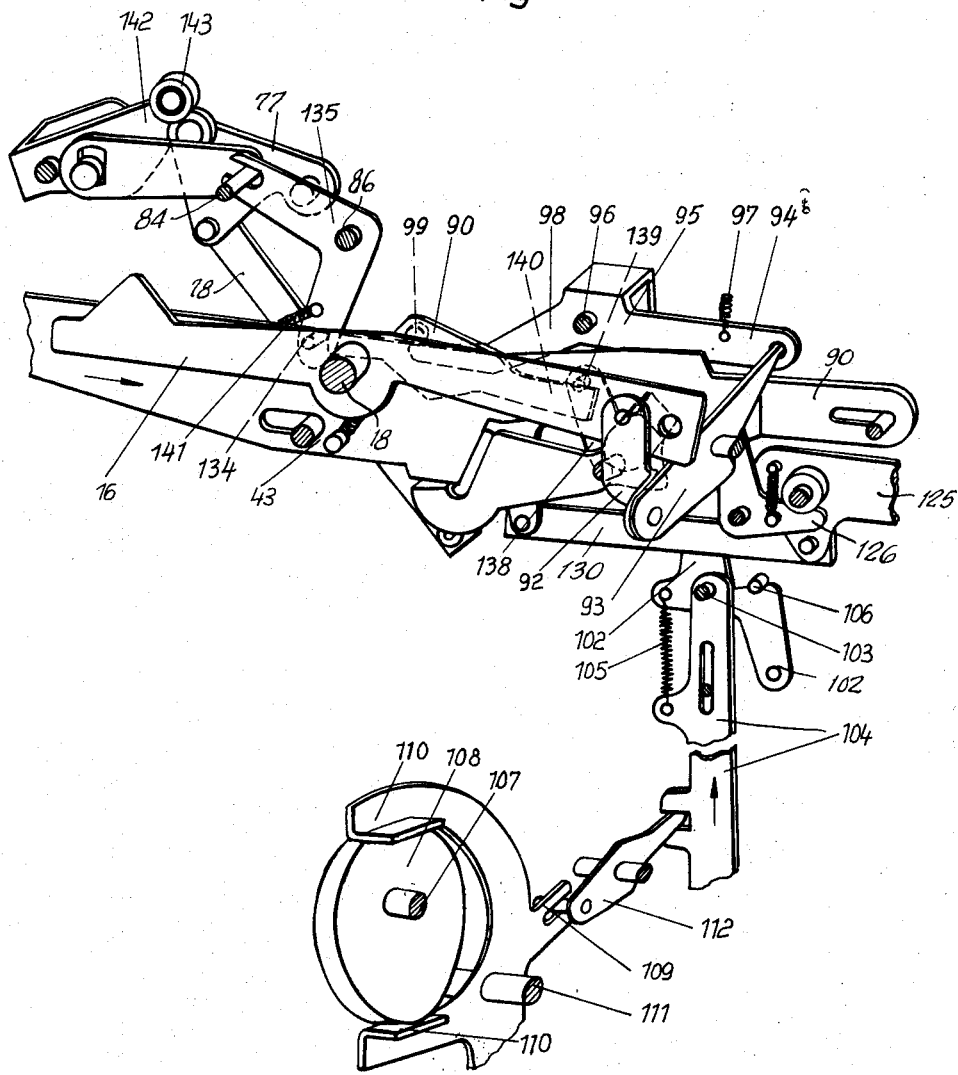

Further characteristic features, advantages and objects of the invention will be apparent from the following description when considered with reference to the accompanying drawings. In the drawings, wherein like reference numerals denote corresponding parts throughout the several views:

FIG. 1 is a cross section through the machine embodying the invention, looking from the left and viewing the apparatus for lowering the function levers and connecting for carriage return motion, FIG. 2 is a view as in FIG. 1, but showing the typewriter and keyboard lock and the cams for lowering the function levers, FIG. 3 is a perspective view of the machine, FIG. 4 shows the mechanism for lowering the function levers, in raised position, and for connecting and disconnecting the normal carriage returns, FIG. 5 shows the mechanism of FIG. 4 with function levers lowered and carriage return connected, FIG. 6 shows a mechanism as in FIG. 4, but for connecting and disconnecting partial carriage returns, FIG. 7 shows the mechanism for connecting and disconnecting the normal and partial carriage returns by means of slides of the program control set, FIG. 8 shows the connecting apparatus for carriage returns, as seen from the front, FIG. 8a shows connecting apparatus of FIG. 8, seen from the left, FIG. 9 shows the apparatus for lowering the function levers through the tabulator and shift lever for coupling in the typewriter, FIG. 9a is an enlarged partial view of FIG. 9, FIG. 10 illustrates details of FIG. 9, with a locking device to prevent lowering of the function levers during the movement of the carriage, as well as coupling in the device of FIG. 9 through the program control set of the accounting carriage, FIG. 11 shows the apparatus which prevents the lowered function levers from rising, FIG. 12 is a comprehensive view of the function levers with the apparatus for their lowering and raising, FIG. 13 illustrates the mechanism for swinging in the shift lock upon coupling in the typewriter, FIG. 14 illustrates the drive and locking mechanism for raising the sunk function levers, FIG. 15 shows the apparatus of FIG. 14 with the function levers raised, and FIG. 16 is a partial view of the program control set.

Referring now in detail to the drawings, an accounting machine 1 embodying the invention comprises, in a keyboard 2, a digit keyboard 3 for introducing the various data into one of counting mechanisms 4 (FIG. 1). A typewriter keyboard 5 located within keyboard 2 serves to actuate a built-in typewriter 6 (FIG. 2) which is made operative by means of a shifting lever 7 and is driven by means of a drive motor 8 of accounting machine 1. A bookkeeping carriage 9 (FIG. 3) is fastened by a frame 10 to a frame 11 of the machine, and includes an interchangeable program control set 13 which comprises a plurality of function slides 14 and 14a, as will be discussed hereunder in detail, and column slides 15 to control an accounting program (FIG. 5). The frame 10 also serves to support the carriage 9. The slides 14 and 14a are so inserted into program control set 13 that in each particular case they are opposite requisite function levers 16, cooperating with the slides 14, and actuate them when bookkeeping carriage 9 stops at a column of the form to be entered, that is, when one of the column guides 15 comes up against a carriage stop 17 (FIG. 1). In this position the function levers 16 are rotated around a common pivot 18 by the respective function slides 14 and 14a inserted in the program control set.

This motion of function levers 16 is employed for preparing the various functions, such as, for example, addition, subtraction, subtotal, total, etc. In order to prevent this rotation of function lever 16 in the course of tabulation movements, as well as in carriage movements through the carriage advance lock of the typewriter and carriage returns, the function levers as an entire group are lowered out of the way of the motion of the slides 14, 14a, that is shaft 18 is moved downward. The lowering of function levers 16 during the various movements of the carriage is performed as follows:

*Lowering of Funcion Levers in Ordinary Carriage Return*

As represented in FIG. 4, all the parts of the apparatus for lowering the function levers 16 are in the ordinary position for normal bookkeeping operations. Function levers 16 are raised (FIG. 15), that is shaft 18, on which the function levers 16 are rotatively mounted, is in the upper of two possible positions. The preparation of the various functions for the next operation of the machine is performed in a well-known manner, function slides 14 and 14a of program control set 13 (FIG. 5) urging function levers 16 and the latter rotating counterclockwise.

If a carriage return movement is to be effected in an accounting form column, manual setting means are actuated, for example a carriage return key 19 (FIGS. 3 and 1). Thereby a forked lever 20 (FIGS. 1 and 9) is rotated clockwise, which, by means of its fork 21 encompasses a pin 22 of a saddle lever 24 mounted on a pivot 23, and moves the said saddle lever in a counterclockwise direction. A rod 26 linked to a pin 25 of saddle lever 24 is drawn thereby in the direction of the arrow and, by encompassing a pin 27, rotates a bent lever 28 in the direction of the arrow around its pivot 29 (see FIG. 4). A finger 30 of bent lever 28 enters an opening 31 of a connecting lever 33 mounted on a pivot 32. The transmitted motion rotates connecting lever 33 clockwise, and a dog 34 mounted movably on its moves upward, and engages a trip lever 36 under a saddle 35 and rotates it counterclockwise around a stationary pivot 37 on which it is mounted. Dog 34 is drawn, by a spring 38, with its arm 39 against a boss 40 of connecting lever 33. Trip lever 36, with its saddle-shaped projection 41 (FIG. 6), slides off a guideway 42 of a control rod 43, and thereby eliminates its arresting action. Control rod 43 is drawn in the direction of the arrow (FIG. 4) by a spring 45 fastened to a roller lever 44, since a stud 46 of lever 44 engages rod 43. Therewith lever 44 rotates counterclockwise around its stationary pivot. A well-known jaw coupling is connected with this lever 44 which coupling is operationally connected with the accounting carriage 9 of the machine.

By the counterclockwise movement of lever 44 a connecting lever 47 (FIG. 8) connected with roller lever 44 is entrained in the same direction, which lever, via a connecting lever 48, imparts a counterclockwise rotation, as in FIG. 8a, to a transmission lever 50 mounted on a pivot 49. Inasmuch as there is also mounted on pivot 49 a clutch lever 51, which controls a clutch housing 54 with rollers 52 and 53, clutch lever 51 is likewise given a counterclockwise movement. Clutch housing 54 thereby has its catches 55 brought within the action of clutch dogs 56 of pinion 57. A driving disk 58, rigidly mounted on a shaft 59, transmits the rotatary motion received from drive motor 8 of the machine via spiral gears 60, 61 (FIG. 2) 62 and 63 (FIG. 8a), entraining clutch housing 54, to catches 55 on pinion 57, which, via a further idler 64 mounted in a stationary position (FIG. 1) and via a gear rack 65 initiates and performs the carriage return movement of bookkeeping carriage 9.

Along with the counterclockwise movement of roller lever 44 (FIG. 4), a lug 67 is also drawn downward, that is, counterclockwise around pivot 37 by means of a boss 66 (FIG. 5) of trip lever 36, and leaves a square bolt 68 (FIG. 4) attached to a cam lever 69. The cam lever is mounted rigidly on a shaft 70, and a spring 246 shown in FIG. 14 moves it counterclockwise after being released by lug 67. A roller 72, lying on a guideway 71, of cam lever 69, of a roller lever 73 (FIG. 14) drops into the depression of guideway 71. Thereby function levers 16, which are connected with roller lever 73 via a connecting lever 74, are depressed and thereby are removed out of reach of the function guides 14 in the program control set 13 of bookkeeping carriage 9, as will also be seen from FIG. 5.

The lowering of the function levers 16 and the engagement of the carriage return take place simultaneously, and both mechanisms have assumed the position shown in FIG. 5. If for example the carriage return key 19 is still held down inadvertently when the carriage return has ended, then, as will be seen from FIG. 5 and as already described, connecting lever 33 with dog 34 is rotated clockwise. Dog 34 rotates further than shown in FIG. 5, and indeed so far that it is moved out of the reach of saddle 35 of trip lever 36. Then if, by an apparatus described hereinafter, control rod 43 is moved into its initial position shown in FIG. 4, whereby the carriage return is disconnected, trip lever 36 can turn clockwise and again arrest control rod 43.

Coupling in the carriage return in connection with the lowering of function levers 16 can also take place when there is no program control set 13 in the bookkeeping carriage 9, or when no carriage return key 19 is depressed in the last column of the form. In these cases the carriage always travels to its extreme end position, since there is no longer any column slide 15 hitting against the carriage stop 17, limiting thereby the travel of the carriage. In this terminal position, a margin plate 75 (FIG. 4), which is fastened on movable part 12 of bookkeeping carriage 9, slides in a well-known manner on a roller 76 of a starting lever 77 (FIG. 6), which is movably connected with trip lever 36 by means of a connecting lever 78. Thereby trip lever 36 is rotated so far counterclockwise that projection 41 of control rod 43 is released. At the same time the lever 36 entrains, by means of its boss 66, lug 67 counterclockwise (FIG. 5), so that cam lever 69 is also released. Thus the carriage return is engaged and function levers 16 lowered as has already been described.

This connection of the carriage return may be achieved in various manners. If there is no program control set 13 in bookkeeping carriage 9, or if no slide 14 or 14a is inserted in control set 13 for the purpose of disconnection, the carriage will go to its extreme initial position. Therewith a margin plate 79 (FIG. 4) mounted in the bookkeeping carriage 9 comes onto a roller 80 of roller lever 44 and rotates it against the pull of its spring 45. Roller lever 44 entrains control rod 43 by means of its stud 46 and moves it in the opposite direction with respect to the arrow, so that trip lever 36 may be in a position behind guideway 42 (FIG. 6) and control rod 43 is again arrested. During the motion of control rod 53 cam lever 69 too, as hereinafter described, is also returned to its rest position and once more stopped by lug 67.

If in making entries the carriage return is always disconnected by margin plate 79, that would constitute a loss of time, since the carriage would first have to travel to the extreme position at which margin plate 79 is provided in carriage 9. This mode of operation would be inconvenient, however, and consequently for this reason disconnection of the return is conducted by slides 14 or 14a of program control set 13.

A slide 14 (FIG. 5) runs onto a roller 81 of a disengaging lever 82 and rotated clockwise. Disengaging lever 82 is movably connected by means of an arm 83 by means of a pin 84 with a bent lever 85. Bent lever 85 is rotatively mounted on a pivot 86 and lies with its pin 87 against a step 88 of control rod 43. Bent lever 85 is drawn by a spring 89 against step 88 in the direction of the motion of engagement. By the rotation of disengaging lever 82, bent lever 85 is urged against the pull of spring 89. At the beginning of this movement pin 87 presses against a control push rod 90, which is mounted on a stud 91 of control rod 43. Thereby control rod 43 is displaced in the direction of the arrow, so that trip lever 36 and lug 67 can meet and, as described above and shown in FIG. 4, control rod 43 and cam lever 69 are arrested.

The lowering of the function levers 16 in connection with the carriage return can also be achieved in the various form columns by means of slides 14 or 14a of program control set 13. The function riders 14 or 14a act on a particular function lever 16, and because of the different heights of the function riders 14 and 14a, according to FIGURE 16, these function levers 16 are oscillated differently. The function rider 14a corresponds in the description to the lower rider (FIG. 16). When this lower function rider 14a encounters the corresponding function lever 16 the latter oscillates counterclockwise (FIG. 7). This function lever 16 is connected, via a connecting rod 92 and a connecting lever 93 rotatively mounted on a pin, with an arm 94 of a three-legged lever 95, which is rotatively mounted on a shaft 96. Thereby lever 95 is turned clockwise so far against the pull of a spring 97 that its arm 98 comes up against a stud 99 of control push rod 90, without rotating it. Thereby a pin 101 which is mounted on an arm 100 (FIG. 6) of three-legged lever 95 leaves a pawl 102 which serves as an abutment.

Pawl 102 is rotatively mounted on a stud 103 of a connecting rod 104 and a spring 105 acts to rotate pawl 102 counterclockwise. In the rest position shown in FIG. 6 a stop 106 prevents pawl 102 from rotating. On a rear main shaft 107, driven by drive motor 8 (FIG. 2) is an eccentric 108 (FIG. 7), which, upon rotation of main shaft 107, urges a fork-shaped follower plate 109 over its follower 110 in such a way that it rotates around its pivot 111. By means of a connecting lever 112 this motion is communicated to connecting rod 104, which thereby executes motions to and fro. During an operation of the machine, connecting rod 104 first receives a motion in the direction of the arrow in FIG. 6, and pawl 102 leaves stop 106 and swings counterclockwise until it comes under a stud 113 of trip lever 36.

Since connecting rod 104, driven by the rear main shaft 107 of the machine, goes through a lifting motion, it is moved back again during an operation of the machine, that is, in the direction of the arrow in FIG. 7. Herewith pawl 102 rotates trip lever 36 counterclockwise and control rod 43 shifts to the position shown in FIG. 7. The carriage return is engaged. Trip lever 36 has entrained lug 67 with its boss 66 and cam lever 69 is likewise rotated counterclockwise (FIG. 5), whereby function levers 16 are lowered. After the carriage return is completed, all the parts are brought back to their rest position, as has already been described.

*Lowering of Function Levers for Partial Carriage Return*

In order to start partial carriage return, when the carriage is to be brought back only part of the way up to a given bookkeeping column, an identical arrangement is provided as for normal returns (FIG. 9). This apparatus is mounted on pivots 23 and 29 along with parts 20 to 30. Thereby, upon actuation of a second carriage return key 114 (FIG. 3) a forked lever 115 (FIG. 9), which is next to forked lever 20, is rotated clockwise. By means of its fork 116, forked lever 115 engages a pin 117 of a saddle lever 118, which is mounted on pivot 23 along with saddle lever 24, and moves it counterclockwise.

A pin 119 of saddle lever 118 bears a bar 120, which at its other end is movably attached to a pin 121 of a bent lever 122. Bent lever 122 pivots on pivot 29 along with lever 28 and its finger 123 engages in a hole 124 of a connecting lever 125 (FIG. 4), which is mounted on the same pivot 32 as connecting lever 33, and is given a motion in the clockwise direction. A latch 126 (FIG. 6) is mounted movably on connecting lever 125 and a spring 127 draws latch 126 in the counterclockwise direction. Thereupon an arm 128 comes up against a boss 129 of connecting lever 125. Latch 126 engages saddle 35 of trip lever 36 and rotates this as well counterclockwise until control rod 43 and lug 67 are released from the blocked positions, whereby lowering of function levers 16 and starting of the carriage return takes place in the same way as has been described above.

At the same time the rotation of connecting lever 125 moves a bar 130, which is linked to it, in the direction of the arrow. A stationary and rotatively pivoted bent lever 131, which is movably connected with bar 130, thereby comes with its arm 132 under a pin 133 of control push rod 90, and raises it so high that it comes up against a pin 134 of a bent lever 135. Bent lever 135 is pivoted, along with bent lever 85 (FIG. 4), on pivot 86. Upon release of cam lever 69 by means of lug 67 pivot 70 turns counterclockwise, and so does a control member 136 which is rigidly connected with it.

A bar 137 linked to the control member 136 also executes this movement and by means of its longitudinal slot 247, a double lever 138, which is mounted on pivot 37, is released, and, urged by the pull of a spring (not shown), is rotated counterclockwise. Thereby a pin 139 of double lever 138 comes up against an arm 140 of control push rod 90 and stops it in its raised position, as shown in FIG. 7. By the movement of control rod 43 into the position shown in FIG. 7, bent lever 135 follows the pull of a spring 141 and brings a disconnecting lever 142, which is connected with it, with its roller 143, within the reach of slides 14 of program control set 13. If a slide 14 comes up on roller 143 during the carriage return, lever 142 is moved clockwise until bent lever 135 with its pin 134 brings control push rod 90 so far in the direction of the arrow that control rod 43 and cam lever 69, as has been described above, are stopped. During the return rotation of cam lever 69 (FIG. 5), bar 137 also brings double lever 138 back into its normal position, as shown in FIG. 4, and control push rod 90 is again pulled counterclockwise by a spring 144.

If partial carriage return is to be connected in automatically in connection with the lowering of function levers 16, that is by means of a slide 14 of program control set 13 in one or more form columns as desired, then three-legged lever 95 (FIG. 6) is rotated clockwise by a slide 14, as described hereinabove, via function lever 16, connecting rod 92 and connecting lever 93. By means of this slide 14, lever 95 moves further than under the action of the lower slide 14 described above, and, by means of its arm 98 and stud 99, brings control push rod 90 into the upper position, as is visible from FIG. 7. Therewith pawl 102 is likewise liberated from pin 101 (FIG. 6), and by an operation of the machine, as already described, connecting rod 104 performs a lifting motion, and pawl 102 is able to effect the carriage return and the lowering of the function levers 16 during the upward movement in the direction of the arrow of FIG. 7. Lifting of function levers 16 and disconnection of the carriage return hereto is achieved by a slide 14 running on roller 143 of disconnecting lever 142.

As will be seen from the above description, both carriage returns are disconnected by slides 14 and 14a of program control set 13, and it is therefore a matter of indifference which arrangement is used for normal returns and which one for partial returns.

*Lowering of Function Levers by Actuating Tabulator or Typewriter*

If the bookkeeping carriage 9 tabulates by means of a key or if advancing the carriage takes place via the carriage advance lock of the typewriter, it is not necessary for functions of the machine to be previously inserted or released by slides 14 of program control set 13. Consequently, function levers 16 are in lowered position during these operations, thereby decreasing the noise of the carriage movement as well as the wear on slides 14 and function levers 16. By depressing a familiar tabulator key 145 (FIGS. 1 and 3), by means of a bent lever 146, a bar 147 (FIG. 9), which is mounted on an arm 148 of a rocker arm 149, is caused to move in the direction of the arrow. Rocker arm 149 is thereby moved counterclockwise around a stationary pivot 150, and a plunger 152, linked to its arm 151, is moved in the direction of the arrow in a slotted hole 200. Plunger 152 is linked to an arm 153 of a saddle lever 154, which is mounted displaceably on a pivot 155.

By means of the motion of plunger 152, saddle lever 154 rotates clockwise and moves a connecting bar 156, which pivots on a stud 157 of its other arm 158. Connecting bar 156 is linked to a bent lever 159 and turns it clockwise about its stationary pivot. Bent lever 159 is connected with a tie rod 160 (FIG. 4) which it causes to move downward. Since tie rod 160 is linked to lug 67, the latter is rotated counterclockwise and releases square bolt 68 and thereby cam lever 69. By this means function levers 16 are lowered in the manner already described without any carriage return taking place, since trip lever 36 arrests control rod 43.

If typewriter 6 (FIG. 2) is to be actuated in a given form column, shift lever 7 is rotated clockwise from the "bookkeeping" position shown in FIGS. 2 and 9 to "write," and a shift bar 161 linked to it moves in the direction of the arrow.

Thereby a finger 162, via a connecting lever 163, releases a yoke 164 (FIG. 2), which engages setting slides 165, located in a notch of each key 5. Each of these setting slides 165 bears a pin 166, against which the relevant key 5 presses upon being actuated and displaces the setting slide 165 in the direction of the arrow. Upon this, the relevant setting slide 165 rotates a setting lever 167 into the reach of a stop dog 168 of a setting shaft 169 which rotates upon depression of a key 5. Setting shaft 169 is stopped by stop dog 168 and a type wheel 172, connected via gears 170 and 171, has turned so far that the corresponding type is in front of a typing platen 173. Setting shaft 169 is driven by motor 8 via gears 174—178. On the shaft of gear 178, which goes through a rotation every time a key is operated, there is a cam which, by means of levers 179 and 180, controls a carriage advance lock 181 for the advance by single line spaces of the bookkeeping carriage 9.

During this advance by single line spaces, carriage advance lock 181 is engaged alternately with a ratchet wheel 184 by means of a fixed tooth 182 and a rotary moving tooth 183. Ratchet wheel 184 transmits, by means of a gear 185, the line space movement to a gear rack 186 fastened to the bookkeeping carriage 9, by means of which carriage 9 executes the movement. Fixed tooth 182 acts as a stop for carriage 9 during the line space movement during writing, and during bookkeeping is rotated out of the way of ratchet wheel 184.

By the movement of shift bar 161 in the direction of the arrow in FIG. 9, a slide 187 fastened to it and guided in slots 202, 248 is entrained with it and drawn by a spring 188, in the direction of a detent lever 189, to the arm 190 of which shift bar 161 is linked. Slide 187 has a projection 191 against which a pin 192 of a bent lever 193 comes up (FIG. 13). By means of projection 191 bent lever 193 is released by projection 191 and follows slide 187 counterclockwise by the action of a spring 194 of a locking lever 195. Bent lever 193 is connected with locking lever 195 by means of a connecting wire 196, which locking lever executes a motion counterclockwise and releases fixed tooth 182, which thereby engages ratchet wheel 184.

By the shift movement, carriage stop 17 (FIG. 10) is rotated counterclockwise around its shaft 199 by a lug 197 of shift bar 161 via links 198, 198a, 198b, so far that column slides 15 may go without hindrance through the middle recess of column stop 17.

In addition detent lever 189 (FIGS. 9, 9a) is rotated clockwise around its pivot 155 by shift bar 161. Arm 190 of detent lever 189 comes up against stud 157, entraining saddle lever 154. Saddle lever 154 goes through the same path as during rotation due to plunger 152, and the lowering of function levers 16 takes place in the manner described above.

Thereby plunger 152, linked to saddle lever 154, has moved in the direction of the arrow, and since tabulator key 145 was not actuated, rocker arm 149 remains in the position shown in FIG. 9, and plunger 152 slides idly in its slotted hole 200.

In order to tabulate in the "write" position of shift lever 7, bar 147 is moved in the direction of the arrow by depressing tabulator key 145, and rocker arm 149, as has been described, is rotated counterclockwise. Since plunger 152 has already been shifted in the direction of the arrow and function levers 16 are already lowered, arm 151 now slides in a slot 200 without moving plunger 152. A tie rod 201 linked to arm 148 of rocker arm 149 is mounted at its other end with its slot 202 on a pin 203 of slide 187, and thereby draws the latter into its initial position, which it is in during normal "bookkeeping." Its projection 191 thereby rotates bent lever 193 clockwise, and via connecting wire 196 (FIG. 13) and locking lever 195, shifting tooth 192 is disengaged from carriage advance lock 181, and the carriage moves until the tabulator key 145 is released and slide 187, because of its spring 188, leaves pin 192 of bent lever 193 and fixed tooth 182 once more engages carriage advance lock 181.

When shift lever 7 is shifted back into the "bookkeeping" position, all the parts are once more in the position shown in FIG. 9, while the function levers 16 are lifted by an apparatus described hereinbelow. Calculating operations, transfer or other bookkeeping work can be performed once more. Saddle lever 154, which has been rotated by detent lever 189 via the arm 190 on the bolt 157 via the arm 158, goes back via accumulators into its position shown in FIG. 9.

Since as a rule only certain columns of the form are inscribed with letters, shift lever 7 would have to be shifted to the "write" position in every bookkeeping line of the column in question. In order to relieve the operator, typewriter 6 may be put into operation by slides 14 of program control set 13 as well. In the form column in question a slide 14 comes on to a function lever 16 in a well-known manner (FIG. 10), rotates it counterclockwise, and a clearing lever 205, operatively connected with function lever 16 via a link 204, rotates counterclockwise on effect of a spring 215. Thereby a latch 206 is released and is enabled to slide with its step slot 207 on a pin 208 of detent lever 189, its other end being connected with a rocker lever 209. Rocker lever 209 follows the pull of a spring 210 clockwise, and latch 206 moves analogously in the direction of the arrow. Since latch 206 is drawn upward by a light spring 211, it is able, shortly before the end of its motion in the direction of the arrow, to follow the pull of spring 211, and pin 208 lies at the bottom of step slot 207. By means of an eccentric 212 (FIG. 9) fastened on rear main shaft 107 and driven by drive motor 8 (FIG. 2), a claw 213 is set swinging and a bar 214 fastened to it is given a to-and-fro motion. Bar 214, by means of its pin 245 moves rocker lever 209, which was rotated clockwise, back into its initial position.

By means of pin 208, located in the lower portion of step slot 207, detent lever 189 is rotated clockwise and is given the same position as upon displacement of shift lever 7. Saddle lever 154 is engaged on its stud 157 by arm 190, and rotated, thereby bringing about lowering of function levers 16, as already described. Function levers 16 come out of contact with slides 14, since pivot 18 is moved downward. Clearing lever 205 then follows the pull of its spring 215, presses latch 206 downward and brings it to a halt once again in its withdrawn position, as shown in FIG. 10.

If in a bookkeeping line no writing is done in the form column in which typewriter 6, as described above, is made operative by slides 14 of program control set 13, this column is passed over. However, since even in passing over the column in question the slide 14 comes onto the function levers 16 and rotates it counterclockwise, latch 206 (FIG. 10) is released and moves in the direction of the arrow. In this process latch 206 must not rotate upwards, lest the entrainment of detent lever 189 and thereby the activation of typewriter 6 be hindered. This is achieved by means of a locking lever 216 which lies with its bent projection 217 on latch 206 during the motion of the carriage. Locking lever 216 is positioned with its stud 218 behind carriage stop 17, as in FIG. 10, and is urged against it by a light spring 219. The column slide 15 normally also lies up against carriage stop 17 (FIGS. 1 and 2) and urges it so far in the direction of the arrow in FIG. 10 until a collar 220 fastened on shaft 199 comes into position on a bearing block 221, which is mounted on machine frame 11. Between a second bearing block 222 and a collar 223 fastened on shaft 199 there is a compression spring 224, which moves carriage stop 17 and shaft 199 in the direction opposite to the arrow until collar 223 comes up against bearing block 221.

The force of compression spring 224 is overcome by carriage stop 17 and only operates in the manner described above when carriage stop 17 is rotated so far that column slides 15 can pass without interference through this depression, as during motion of the carriage. This motion of carriage stop 17 in the direction opposite to the arrow in FIG. 10 is transmitted to locking lever 216 by means of its stud 218 in such a way that when collar 223 comes up against bearing block 221, bent projection 217 is positioned on the latch 206 and pin 208 is prevented from being entrained by step slot 207.

Raising the Lowered Function Levers

Control member 136 (FIGS. 4 and 14), which is mounted on the same pivot 70 with cam lever 69, comprises a rotatable latch 225. This comprises two arms 226 and 227. In its rest position arm 226 is positioned up against a projection 228 of a stationary latch 229 (FIG. 15). Latch 229 is drawn by a spring 230 against a like stationary stop 231. A second pivotally mounted latch 232 is urged by the pull of a light spring 233 against a stop 234. Spring 233 is fastened at its other end to latch 225. This assures the positioning of arm 226 up against projection 228 of latch 229. If cam lever 69 rotates counterclockwise so as to depress function levers 16, arm 226 leaves latch 229, since latch 225 is moved downward. Latch 225 tends to move clockwise following the pull of spring 233, but is prevented from doing so by latch 232, since the latter comes up against a stud 235 of latch 225. Upon sliding further downward, stud 235 leaves latch 232, is able to follow the pull of spring 233 (FIG. 14) and comes under the control of a rocker lever 236, which is fastened on a pivot 238 by means of a hub 237 and executes a swinging motion. This swinging motion is transferred by means of the turning of the rear main shaft (FIG. 2) by an eccentric 239 (FIG. 12) via a fork 240 to pivot 238. Latch 225 is at once lifted up again after its sliding downward. However, since function levers 16 should not be lifted until the functions, such as carriage return, tabulation movement or the process of writing are completed, latch 225 must be held as long as necessary disengaged from rocker lever 236.

If lowering of function levers 16 is performed in connection with the carriage return, then, as already described, control rod 43 will be released in the direction of the arrow in order to start the carriage return. This control rod 43 comprises a stud 241 (FIG. 14) which lies up against arm 227 of latch 225 when carriage return is engaged, and the latch remains disengaged from rocker lever 236. At the moment that latch 225 moves downward, when stud 235 tends to leave latch 232, stud 241 is already up against arm 227 of latch 225. Upon disengagement of the carriage return, control rod 43 is moved in the direction opposite the arrow, by means already mentioned. Stud 241 releases arm 227, and latch 225 rotates clockwise and comes under the control of rocker lever 236. The latter, by means of the oscillating motion it is given by drive motor 8, is positioned under latch 225 and entrains it upward. Therewith cam lever 69 rotates clockwise so far that lug 67 can drop securely into place, as shown in FIG. 4. By the rolling of roller 72 on guideway 71 function levers 16 are raised into their initial position (FIG. 15).

By the upward movement of latch 225 (FIG. 15) latch 232 is turned out by stud 235. Arm 226 of latch 225 comes up against projection 228 and thereby rotates latch 229 clockwise, whereby spring 230 is put under tension. If cam lever 69 is arrested and rocker lever 236 goes downward, the load is taken off latch 225. Latch 229 rotates, following the pull of its spring 230, downward to stop 231. Thereby latch 225 is rotated counterclockwise and latch 232 is able once more to fall into place behind stud 235. All the parts have thus been given the position shown in FIG. 15.

If function levers 16 are depressed by a tabulator or by making the typewriter operational, that is, without the columns of a carriage return, connecting bar 156 (FIGS. 9 and 11), as already described, is shifted and with its projection 242 entrains a clearing lever 244 which is rotatively mounted on stationary bearing 243, which clearing lever, in the same way as stud 241 (FIGS. 11, 14, 15), lies up against arm 227 of latch 225, and keeps the said latch disengaged from rocker lever 236 until tabulator key 145 is released or shift lever 7 is turned back to the "bookkeeping" position, whereby connecting bar 156 and clearing lever 244 return to their initial positions (FIGS. 9, 14). Latch 225 turns and comes under control of rocker lever 236 and the raising of function levers 16 takes place in the manner described above.

It will be obvious to those skilled in the art that the illustrated machine is one embodiment only of this invention, and furthermore, that various changes may be made in materials and construction without departing from the spirit and scope of this invention as defined in the appended claims.

We claim:

1. An accounting machine of the type described including a displaceable paper carriage adapted to perform tabulating and return motions with control sets in said carriage, comprising, in combination, a plurality of slides in said sets, said slides being selectively adjustable into operative positions, function levers normally held in raised position and engageable by the operative slides to be lowered thereby and thus initiating different functions of the machine, said function levers being adapted to be moved out of the path of motion of said slides at certain movements of the machine, a cam lever having a guideway defining a depressed portion and having two positions, a roller lever connected with said function levers and bearing on said cam lever to hold said function levers in said path of the slides when engaging the non-depressed portion of said cam lever in its first position and to hold said function levers out of said path when engaging said depressed portion of said cam lever in its second position, a lug for locking said cam lever in said first position, a spring urging said cam lever into said second position, two control means connected to said lug and operative independently of each other to remove said lug from the locking position, one of said means being a connecting rod actuatable by the presetting of tabulator and typewriter operations and the performance of other functions by said slides, the other of said two means being a control trip lever rockable from a first to a second position for initiating the carriage return, another locking means in engagement with said cam lever and in operative connection with said control trip lever for preventing said cam lever from returning to said first position when said control trip lever is in said second position, and cyclically operative means for removing said other control means from locking position when said control trip lever has returned to said first position.

2. An accounting machine according to claim 1, further comprising a shifting lever for operating said connecting rod of said lug for releasing said cam lever for starting a typewriter portion of the machine, a tabulator key thereof, and a tie rod in a connection of said key with said releasing lug.

3. An accounting machine according to claim 1, wherein said connecting rod is linked to said locking lug, the latter being actuated by the intermediary of said connecting rod in dependence from the selective actuation of said tabulator key and of said cam lever.

4. An accounting machine according to claim 1, wherein said control trip lever at the starting of said carriage return is turned by a starting lever moved by a margin plate attached to said carriage.

5. An accounting machine according to claim 1, further comprising a control rod shiftable between two end positions, a control lever connected to said control rod, a second spring urging said control rod into its first position in which said control lever is in its operative position in which it cooperates in the initiation of said carriage return, locking means including a projection of said control trip lever to hold said control rod in its second position in which said control lever is in its position of rest, and means for simultaneously removing said lug from said locking position and moving said control trip lever from its first to its second position.

6. An accounting machine according to claim 1, further comprising a three-legged lever connected to one of said function levers and being responsive to the action of slides of different heights so as to be adapted to different functions depending on the amount of its deflections, said three-legged lever in its position of rest bearing against said other locking means so as to prevent it from moving but to release said locking means upon a predetermined deflection.

7. An accounting machine according to claim 1, further comprising dog, pawl and latch means in constant contact with said control trip lever, and manually adjustable means in engagement with said dog, pawl and latch means to actuate the latter for total or partial carriage return.

8. An accounting machine according to claim 1, wherein said connecting rod is a control rod, further comprising a control push rod rockably mounted on said control rod, and disengaging levers for total and partial carriage return, said control push rod being operatively connected to said disengaging levers for controlling the releases.

9. An accounting machine according to claim 8, further comprising a bent lever for each disengaging lever which co-operates with said control rod so that said disengaging levers move into the path of said slides only when said control rod is released for coupling the carriage return.

10. An accounting machine according to claim 8, further comprising a three-legged lever connected to one of said function levers and being responsive to the action of slides of different heights so as to be adapted to different functions depending on the amount of its deflections, said control push rod being rockable by said three-legged lever upon a deflection of the latter by a large slide.

11. An accounting machine according to claim 10, further comprising a bent trip lever connected to said control push rod and manually actuating means for rocking said bent trip lever to cause partial carriage returns.

12. An accounting machine according to claim 11, further comprising a double lever, said control push rod being held in turned position by said double lever being connected with said cam lever for lowering said function levers until said cam lever is returned to normal position.

13. An accounting machine according to claim 1, wherein said connecting rod is a control rod, further comprising a shifting lever for operating said control rod of said lug for releasing said cam lever for starting a typewriter being part of said machine and a tabulator key thereof, a tie rod in a connection of said key with said lug, a tabulator key, a rod and a change-over lever, a shift rod connected to said shifting lever for switching over to typing, said two last-mentioned rods being attached each to a saddle lever turnable about the same axis and at the same rate upon actuation by said tabulator key and said change-over lever, respectively, and connecting means including a connecting bar between said function levers and said lug for releasing the latter.

14. An accounting machine according to claim 13, wherein a notched detent lever is substituted for said saddle lever.

15. An accounting machine according to claim 14, further comprising a clearing lever, a spring-biased latch, and a power driven eccentric, said clearing lever, in response to one of said slides engaging one of said function levers, being adapted to release said latch for taking along said notched detent lever in response to a movement of said eccentric.

16. An accounting machine according to claim 14, further comprising a clearing lever, a power driven eccentric, said clearing lever, in response to a slide engaging one of said function levers, being adapted to release said latch, the latter being provided with a stepped slot and said notched detent lever including a pin engaging said stepped slot whereby, upon said latch being released, it will take along said notched detent lever.

17. An accounting machine according to claim 13, wherein said second connecting rod includes an angular projection, and said other locking means include a lifting latch with an arm, further comprising a clearing lever and a cyclically actuated rocker lever, said projection acting on said arm via said clearing lever to hold said lifting latch out of engagement with said rocker lever until said connecting bar has been returned to its initial position.

18. An accounting machine according to claim 13, further comprising a ratchet wheel of said carriage, a fixed switching tooth of the typewriting assembly adapted to engage said wheel, and connecting means between said shifting lever and said tooth to cause its engagement with said wheel.

19. An accounting machine according to claim 1, further comprising a shifting lever for operating said connecting rod of said lug for releasing said cam lever for starting a typewriter being part of said machine and a tabulator key thereof, a tie rod in a connection of said key with said lug, a lifting latch including two arms, an axle of said cam lever, and a control member mounted on said axle, said lifting latch being movably secured to said control member which rocks together with said cam lever.

20. The machine of claim 19, further comprising two additional latches, a spring for each of said latches, a rocker lever being part of said other locking means, said additional latches being added to hold said lifting latch out of the range of said rocker lever, one of said additional latches acting during the rest and the other one during the rocking of said lifting latch by said cam lever.

21. An accounting machine according to claim 19, further comprising two different means to hold said lifting latch out of engagement with said rocker lever, one of said two means being effective during the carriage return and the other one during the tabulating movement and when said shifting lever is operated.

22. An accounting machine according to claim 1, further comprising a control rod shiftable between two end positions, a control lever connected to said control rod, a second spring urging said control rod into its first position in which said control lever is in its operative position in which it cooperates in the initiation of said carriage return, locking means including a projection of said control trip lever to hold said control rod in its second position in which said control lever is in its position of rest, means for simultaneously removing said lug from said locking position and moving said control trip lever from its first to its second position, a lifting latch including two arms, an axle of said cam lever, a control member mounted on said axle, said lifting latch being movably secured to said control member which rocks together with said cam lever, and connecting means including a connecting bar between said function levers and said lug for releasing the latter, said connecting bar and a stud of said control rod being operative on the one arm of said lifting latch while a spring-biased latch is operative on the other arm thereof.

23. An accounting machine according to claim 22, further comprising a clearing lever, and wherein said cyclically operative means includes a rocker lever, said lifting latch being held out of engagement with said rocker lever, on the one hand, by said stud during the carriage return, and on the other hand, by said clearing lever during the tabulating and typewriting operations.

References Cited in the file of this patent

UNITED STATES PATENTS

| | | |
|---|---|---|
| 1,260,728 | Stickney | Mar. 26, 1918 |
| 2,214,897 | Bower | Apr. 26, 1937 |
| 2,275,671 | Anderson | Mar. 10, 1942 |
| 2,291,154 | Fettig | July 28, 1942 |
| 2,570,913 | Fleming | Oct. 9, 1951 |